United States Patent Office
3,729,473
Patented Apr. 24, 1973

3,729,473
HYDROQUINOLINE THIOCARBAMIC
ACID DERIVATIVES
Horst Böshagen, Haan/Rhineland, and Manfred Plempel, Wuppertal-Elberfeld, Germany, assignors to Farbenfabriken Bayer Aktiengesellschaft, Leverkusen, Germany
No Drawing. Filed Apr. 3, 1970, Ser. No. 25,557
Claims priority, application Germany, Apr. 5, 1969,
P 19 17 739.0
Int. Cl. C07d 33/60
U.S. Cl. 260—283 S                    32 Claims

ABSTRACT OF THE DISCLOSURE

Compounds of the formula:

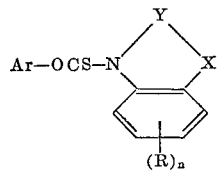

wherein:

X is sulphur, oxygen, $NR^1$, CO, $CHR^1$ or $CR^1$ wherein $R^1$ is hydrogen or straight or branched chain lower alkyl, Y is a straight or branched chain aliphatic moiety of 1 to 3 carbon atoms, or said aliphatic moiety linked to X by a double bond, R is hydrogen, halogen, lower alkyl, lower alkoxy, lower alkylmercapto or trifluoromethyl, $n$ is 1, 2 or 3, and Ar is an unsubstituted or substituted aromatic moiety, are produced by reacting a compound of the formula:

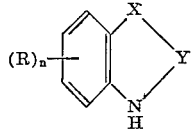

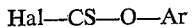

wherein X, Y, R and $n$ are as above defined with a thiocarbonic acid ester halide of the formula:

Hal—CS—O—Ar wherein Hal is halogen and Ar is as above defined. These compounds are useful as antimycotics for the treatment of fungal infections which are pathogenic to humans and animals.

---

The present invention is concerned with thiocarbamic acid derivatives, to a process for their production, to pharmaceutical compositions useful for the treatment of mycotic infections and to methods of treating mycotic infections in humans and animals.

More particularly, the present invention is concerned with the compounds of the formula:

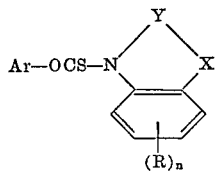   (I)

wherein:

X is sulphur, oxygen, $NR^1$, CO, $CHR^1$ or $CR^1$ wherein $R^1$ is hydrogen or straight or branched chain lower alkyl, Y is a straight or branched chain aliphatic moiety of 1 to 3 carbon atoms, or said aliphatic moiety linked to X by a double bond, R is hydrogen, halogen, lower alkyl, lower alkoxy, lower alkylmercapto or trifluoromethyl, $n$ is 1, 2 or 3, and Ar is an unsubstituted or substituted aromatic moiety.

These compounds may be produced by reacting a heterocyclic compound of the formula:

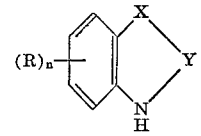

(II)

wherein X, Y, R and $n$ are as above defined, with a thiocarbonic acid ester halide of the formula:

Hal—CS—O—Ar         (III)

wherein Hal is halogen and Ar is as above defined.

It is preferred that the lower alkyl, lower alkoxy and lower alkylmercapto moieties set forth above contain from 1 to 4 carbon atoms in the alkyl portion. These moieties may be straight or branched chain.

The preferred halogens are fluorine, chlorine or bromine.

The preferred aromatic moieties are those which contain up to 12 carbon atoms in the aromatic portion and the preferred moieties are phenyl and naphthyl. The preferred substituents on the aromatic moieties are halogen, especially fluorine, chlorine or bromine, lower alkyl or lower alkoxy, and particularly lower alkyl of 1 to 4 carbon atoms or lower alkoxy of 1 to 4 carbon atoms.

Heterocyclic compound (II) may be used in the form of a salt.

According to one embodiment of the process of the present invention the sodium salt of the heterocyclic base (II) is first formed (e.g. in a suitable solvent such as hexamethylphosphoric acid triamide (HMPA), dimethyl formamide (DMF) toluene or benzene) with the use of, for example, sodium hydride, and is subsequently reacted with the thiocarbonic acid ester chloride at a slightly elevated temperature (about 30 to about 50° C.).

Obviously, it is also possible to react the heterocyclic base as such with the carbonic acid ester chloride in a suitable solvent, for example $CHCl_3$, $CH_2Cl_2$, benzene, toluene, ethanol, methanol or acetone, and with the addition of a tertiary base, for example triethylamine or N,N-dimethyl-benzylamine.

The heterocyclic bases and ester halides used as starting material are known and can be obtained by known methods.

Working up of the reaction mixtures may be carried out in the usual way.

The excellent antimycotic effect of the newly prepared compounds is surprising and could not be foreseen, since after the elaborate investigations of T. Noguchi, Y. Hashimoto, K. Myazaki and A. Kayi, J. Pharm. Soc. Japan, 88 (2), 227–234 (1968), 88 (3), 335–343 (1968), 88 (3), 344–352 (1968) and 88 (3), 353–358 (1968) it has hitherto been assumed that only compounds of the type

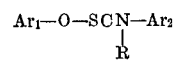

have an antimycotic effect and even these only if R denotes a methyl group.

The excellent antimycotic activity of the compounds of the present invention may be shown by the following inhibition values (minimum inhibition concentration i.e. MIC) in relation to a variety of fungi pathogenic to humans and animals. 2,3-dihydro-N-[naphthyl-(2)-oxy-thiocarbonyl]-1,4-benzothiazine was selected as a compound representative of those of the present invention and the MIC's of this compound against various fungi are listed below in Table 1.

TABLE 1

| Germ | Minimum inhibition concentration γ/per ml. test medium | |
|---|---|---|
| | Without serum | With serum |
| Trichophyton mentagrophytes | <1γ | 1γ |
| Trichophyton equinum | <1γ | 4γ |
| Trichophyton verucosum | <1γ | <1γ |
| Trichophyton rubrm var. Algochonosa | <1γ | <1γ |
| Trichophyton rubrum var. Yesosa | <1γ | <1γ |
| Trichophyton concentricum | <1γ | |
| Trichophyton schoenlein | 4γ | |
| Microsporum felineum | <1γ | |
| Microsporum audouinii | <1γ | |
| Microsporum gallinae | (1) | |
| Chromomyces carrioni | (1) | (1) |
| Epidermophyton floccos | <1γ | 4γ |
| Nocardia brasiliensis | (2) | |
| Candida albicans | >100γ | |
| Sporotrichum | >40γ | >40γ |
| Cryptococcus neoformans | >40γ | 40γ |
| Madurelle grisea | 40γ | 40γ |
| Histoplasma capsulatum | | 4γ–1γ |
| Allescheria boydii | >40γ | >40γ |
| Phialophora pedrosoi | >40γ | >40γ |
| Penicillium commune | >100γ | |
| Aspergillus niger | 100γ | 100γ |

[1] 40γ–1γ=50% inhibition.
[2] 4γ=50% inhibition.

ANTIMYCOTIC EFFECT IN ANIMAL TEST

The representative compound tested in Table 1 exhibits a very good effect in a model experiment with trichophytia caused in guinea pigs by *Trichophyton mentagrophytes,* when 0.5 and 1% solutions were locally applied once daily, starting with the third day after infection, until the eighth day after infection. A rapid retrogression of the primary symptoms of infection (reddening of the skin and loss of hair) takes place, and the animals can be considered completely cured on the 10th day after infection. A typical course of infection is illustrated in Table 2.

TABLE 2

| Test groups | Evaluation of course of infection after days post infection | | | | | | | | | |
|---|---|---|---|---|---|---|---|---|---|---|
| | 1 | 2 | 3 | 4 | 5 | 6 | 7 | 8 | 9 | 10 |
| Untreated control: | | | | | | | | | | |
| 1st animal | 0 | 0–1 | 0–1 | 1 | 2 | 2–3 | 3 | 4 | 4–5 | 5 |
| 2nd animal | 0 | 0–1 | 0–1 | 1 | 1–2 | 2 | 3 | 3–4 | 4 | 4–5 |
| 3rd animal | 0 | 0–1 | 0–1 | 1 | 1–2 | 2–3 | 3 | 4 | 5 | 5 |
| Substance (a) (of Example 1) 1%: | | | | | | | | | | |
| 1st animal | 0 | 0–1 | 1 | 1 | 1 | 1 | 1 | 1 | 1 | 1 |
| 2nd animal | 0 | 0–1 | 1 | 1 | 0–1 | 0–1 | 0–1 | 0–1 | 0–1 | 0–1 |
| 3rd animal | 0 | 0–1 | 1 | 1 | 1 | 1 | 1 | 1 | 1 | 1 |
| Substance (b) 1% as control: | | | | | | | | | | |
| 1st animal | | 0–1 | 1 | 1 | 0–1 | 1 | 1–2 | 2–3 | 2 | |
| 2nd animal | | 0–1 | 1 | 1 | 1 | 1 | 1–2 | 2 | 2–1 | |
| Substance (c) 1%: | | | | | | | | | | |
| 1st animal | | 0–1 | 1 | 1 | 0–1 | 1 | 1–2 | 1–2 | 1–2 | |
| 2nd animal | | 0–1 | 1 | 1 | 0–1 | 0–1 | 1 | 1–2 | 1–2 | |
| 3rd animal | | 0–1 | 0–1 | 1 | 0–1 | 0–1 | 1 | 1 | 2 | |
| Substance (d) 1%: | | | | | | | | | | |
| 1st animal | | 0–1 | 0–1 | 0–1 | 0–1 | 1 | 1 | 1 | 1 | |
| 2nd animal | | 0–1 | 0–1 | 0–1 | 0–1 | 0–1 | 0 | 0 | 0 | |
| 3rd animal | | 0–1 | 0–1 | 0–1 | 0–1 | 1 | 1 | 1–2 | 1–2 | |
| Substance (e) 1%: | | | | | | | | | | |
| 1st animal | | 1 | 1–2 | 0–1 | 0–1 | 0–1 | 1 | 1 | 1 | |
| 2nd animal | | 1 | 1–2 | 1 | 0–1 | 0–1 | 1 | 1 | 1 | |
| 3rd animal | | 0–1 | 1–2 | 0–1 | 0–1 | 0–1 | 0–1 | 0–1 | 0–1 | |
| 4th animal | | 1 | 1 | 0–1 | 0–1 | 0 | 0–1 | 0–1 | 0–1 | |

In Table 2, substance (a)=compound of Example 1; (b)=3 - methyl-N-methyl-N-[naphthyl-(2)-oxy-thiocarbonyl]-aniline (for comparison); (c)=compound of Example 24; (d)=compound of Example 25; (e)=compound of Example 42.

Explanation of numbers: 1=reddening; 2=reddening and beginning of loss of hair; 3=strong loss of hair; 4=beginning of bleeding ulceration; 5=expansive bleeding ulcerations.

A primary fungicidal effect on Dermatophytes could be found in the Warburg test for the new compound (a) at concentrations of 0.2 to 1 γ/ml. substrate.

The compounds of the present invention are useful for the treatment of fungal infections in both humans and animals. With regard to the veterinary medicine aspects, they have been found especially suitable for combating fungal infections caused by the following fungi: *Trichophyton verrucosum, Trichophyton quinckeanum, Trichophyton rubrum, Trichophyton mentagrophytes, Trichophyton gallinae,* as well as Microsporon species, particularly *Microsporin canis* and *felineum.*

In general, it has proved advantageous to administer locally formulations containing about 1% to about 2% of active ingredient once to twice daily, in order to achieve effective results. Nevertheless it may be necessary to deviate from the aforesaid amounts, depending on the body weight of the test animal and the method of application, but also on the animal species and the individual reaction to the medicament, and on the type of formulation and the moment in time or the interval at which application takes place. In some cases it may be sufficient to use less than the aforesaid minimum amount whereas in other cases it will be necessary to go beyond the aforesaid upper limit. If larger amounts are administered, it may be advisable to distribute these over the day in several individual doses. The same range of dosage is envisaged for application in human medicine, and the other explanations given above apply analogously.

The compounds of the present invention can be applied alone or in combination with pharmaceutically acceptable diluents or carriers. Suitable forms for application in combination with various inert carriers are powders, sprays, aqueous suspensions, elixirs, syrups and the like. Such carriers comprise solid extenders or fillers, a sterile aqueous medium as well as non-toxic organic solvents and the like. In the aforesaid case, the therapeutically active compound should be present at a concentration of about 0.5 to 90 percent by weight of the total mixtures, that is to say in quantities which suffice to achieve the above range of dosage.

In the case of aqueous suspensions and/or elixirs, the active ingredient can be used together with diluents such as water, ethanol, propylene glycol, glycerol and similar compounds or combinations of this type.

The invention further provides a medicament in dosage unit form comprising at least one of the new active compounds either alone or in admixture with a solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragées; in wrapped or concealed form, such as wrapped powders, cachets, sachets, or capsules; in ampoules, either free or as a sterile solution suitable for parenteral injection; or in any other form known to the art.

The invention also provides a method of combating fungus infections in humans and animals (especially domestic animals) which comprises applying to the animals at least one of the new active compounds either alone or in admixture with a solid or liquid diluent or carrier.

The following non-limitative example more particularly illustrates the present invention.

EXAMPLE 37.8 g. (0.25 mol) 2,3-dihydro-1,4-benzothiazine were dissolved in 250 ml. hexamethyl-phosphoric acid triamide and 11.3 g. (0.25 mol) sodium hydride (53.3% in paraffin) were added. The mixture was stirred at room temperature until the evolution of hydrogen had stopped (about 30 minutes). Subsequently, 55.7 g. (0.25 mol) O-β-naphthyl-thiocarbonic acid ester chloride were slowly added, the mixture was stirred at room temperature for 15 minutes and then at 50° C. for 15 minutes. The reaction solution was poured into 2.5 litres of water, the precipitated crude product was filtered off with suction, the adhering smears were removed by stirring with some acetone, and the product was recrystallised from dioxan/ethanol.

(1) 64.5 g. (76.5%) 2,3-dihydro-N-[naphthyl-(2)-oxy-thiocarbonyl]-1,4-benzothiazine were obtained in the form of slightly yellowish prisms of M.P. 133° C.

The following compounds were obtained in an analogous way:

(2) 2,3-dihydro-6-methyl-N-[naphthyl - (2) - oxy-thiocarbonyl] - 1,4 - benzothiazine.—After recrystallisation from dioxan/ethanol, the compound forms colourless small cuboids of M.P. 128° C.

(3) 2,3-dihydro - 6 - trifluoromethyl-N-[naphthyl-(2)-oxy-thiocarbonyl]-1,4-benzothiazine.—Colourless coarse prisms from dioxan/ethanol; M.P. 126° C.

(4) 2,3-dihydro-2-methyl - N - [naphthyl-(2)-oxy-thiocarbonyl]-1,4-benzothiazine.—Colourless rectangular flakes (dioxan/ethanol) of M.P. 169° C.

(5) 2,3-dihydro - 2,6 - dimethyl-N-[naphthyl-(2)-oxy-thiocarbonyl] - 1,4 - benzothiazine.—Colourless prisms from dioxan/ethanol; M.P. 154° C.

(6) 2,3-dihydro-5,6-benzo - N - [naphthyl-(2)-oxy-thiocarbonyl]-1,4-benzothiazine.—Colourless prisms of M.P. 164° C. from dioxan/ethanol.

(7) 2,3-dihydro - N - [4-fluorophenoxy-thiocarbonyl]-1,4-benzothiazine.—Colourless hexagonal flakes (dioxan/ethanol) of M.P. 124° C.

(8) 2,3-dihydro - N - [4-chlorophenoxy-thiocarbonyl]-1,4-benzothiazine.—Shiny colourless scaly flakes (dioxan/ethanol) of M.P. 140° C.

(9) 2,3,4,5-tetrahydro - N - [naphthyl-(2)-oxy-thiocarbonyl] - 1,5 - benzothiazepine.—After recrystallisation from dioxane ethanol, colourless small prisms of M.P. 167° C.

(10) 2,3-dihydro-N-[naphthyl - (2) - oxy - thiocarbonyl]-1,4-benzoxazine.—Colourless broad prisms (dioxan) of M.P. 181° C.

(11) 2,3-dihydro-6-methyl-N-[naphthyl-(2)-oxy - thiocarbonyl]-1,4-benzoxazine.—Colourless prisms of M.P. 143° C. from dioxan.

(12) 2,3-dihydro-6-methoxy-N-[naphthyl-(2)-oxy-thiocarbonyl]-1,4-benzoxazine.—Colourless prisms (dioxan/ethanol) of M.P. 158° C.

(13) 2,3-dihydro-2,7-dimethyl-N-[naphthyl-(2) - oxy-thiocarbonyl]-1,4-benzoxazine.—Colourless small prisms (dioxan/ethanol) of M.P. 144° C.

(14) 2,3-dihydro-2-methyl-N-[naphthyl-(2)-oxy - thiocarbonyl]-1,4-benzoxazine.—Colourless prisms of M.P. 158° C. from dioxan/ethanol.

(15) 2,3-dihydro-2,6-dimethyl-N-[naphthyl-(2) - oxy-thiocarbonyl]-1,4 - benzoxazine.—After recrystallization from dioxan/ethanol, colourless, prisms of M.P. 132° C.

(16) 2,3-dihydro-2-methyl-6-methoxy - N - [naphthyl-(2)-oxy-thiocarbonyl]-1,4 - benzoxazine.—Colourless rectangular flakes (dioxan/ethanol) of M.P. 151° C.

(17) 2,3-dihydro-N-[naphthyl-(2)-oxy - thiocarbonyl]-indole.—Colourless prisms of M.P. 162° C. from dioxan/ethanol.

(18) 2,3-dihydro-2-methyl-N-[naphthyl-(2)-oxy - thiocarbonyl]-indole.—Colourless prisms of M.P. 138° C. from dioxan.

(19) 1,2,3,4-tetrahydro-N-[naphthyl-(2)-oxy - thiocarbonyl]-quinoline.—Almost colourless prisms of M.P. 122° C. from dioxan/ethanol.

(20) 1,2,3,4-tetrahydro-6-methyl-N-[naphthyl-(2)-oxy-thiocarbonyl] - quinoline.—After recrystallisation from ethanol, colourless, thin, matted small needles of M.P. 128° C.

(21) 1,2,3,4-tetrahydro-2-methyl-N-[naphthyl-(2)-oxy-thiocarbonyl]-quinoline.—Colourless thin small needles of M.P. 147° C. from dioxan/ethanol.

(22) 1,2,3,4-tetrahydro-5-methyl-N-[naphthyl-(2)-oxy-thiocarbonyl]-quinoline.—Colourless prisms (from ethanol) of M.P. 121° C.

(23) 1,2,3,4-tetrahydro-7-methyl-N-[naphthyl-(2)-oxy-thiocarbonyl]-quinoline.—Colourless small needles (from ethanol) of M.P. 114° C.

(24) 1,2,3,4-tetrahydro-8-methyl-[naphthyl-(2) - oxy-thiocarbonyl]-quinoline.—After recrystallisation from ethanol, colourless flakes of M.P. 102° C.

(25) 1,2-dihydro-4,6-dimethyl-[naphthyl-(2)-oxy-thiocarbonyl]-quinoline.—After recrystallisation from dioxan/ethanol, the compound forms yellowish crystals of M.P. 124° C.

(26) 1,2-dihydro-4-methyl-N-[naphthyl-(2)-oxy - thiocarbonyl]-quinoline.—Yellowish small flakes (dioxan/ethanol) of M.P. 122° C.

(27) 1,2,3,4-tetrahydro-5-methyl-N-[4-fluorophenoxy-thiocarbonyl]-quinoline.—Colourless prisms (dioxan/ethanol) of M.P. 151° C.

(28) 1,2,3,4-tetrahydro-8-methyl-N-[4-chloro-phenoxy-thiocarbonyl]-quinoline.—Colourless rectangular flakes (dioxan/ethanol) of M.P. 134° C.

(29) 1,2,3,4-tetrahydro-4-oxo-N-[naphthyl-(2) - oxy-thiocarbonyl]-quinoline.—Colourless prisms of M.P. 142° C. from dioxan/ethanol.

(30) 1,2,3,4-tetrahydro-1-methyl-6-methylmercapto - 4-[naphthyl-(2)-oxy-thiocarbonyl]-quinoxaline.—Pale yellow prisms (dioxan/ethanol) of M.P. 133° C.

(31) 1,2,4,5-tetrahydro-2-methyl-1-ethyl-5 - [naphthyl-(2)-oxy-thiocarbonyl]-1,5 - benzodiazepine.—Colourless prisms of M.P. 112° C. from ethanol.

(32) 2,3-dihydro-N-[4-cholrophenoxy-thiocarbonyl]-1,4-benzoxazine.—Colourless, shiny, scaly flakes M.P. 140° C. (dioxan/ethanol).

(33) 2,3,4,5-tetrahyro-2-methyl-N-[naphthyl-(2)-oxy-thiocarbonyl] - 1,5 - benzothiazepine.—Colourless prisms (dioxan/ethanol); M.P. 154° C.

(34) 1,2,3,4-tetrahydro-3-methyl-N-[naphthyl-(2)-oxy-thiocarbonyl-quinoline.—Colourless prisms from dioxan/ethanol; M.P. 151° C.

(35) 1,2,3,4-tetrahydro-6,8-dimethyl-N-[naphthyl-(2)-oxy-thiocarbonyl]-quinoline.—Colourless cuboids (acetonitrile); M.P. 99° C.

(36) 1,2,3,4-tetrahydro-4,6,7-trimethyl-N - [naphthyl-(2)-oxy - thiocarbonyl] - quinoline.—Colourless prisms (acetonitrile); M.P. 116° C.

(37) 1,2,3,4-tetrahydro-3,8-dimethyl-N-[naphthyl-(2)-oxy - thiocarbonyl] - quinoline.—Colourless prisms from acetonitrile; M.P. 101° C.

(38) 1,2,3,4-tetrahydro-N-[4-chlorophenoxy - thiocarbonyl]-quinoline.—Colourless prisms (dioxan/ethanol); M.P. 124° C.

(39) 1,2,3,4-tetrahydro-6-methyl-N-[4-chlorophenoxy-thiocarbonyl]-quinoline.—Colourless flakes from dioxan/ethanol; M.P. 121° C.

(40) 1,2,3,4-tetrahydro-2-methyl-N-[4-chlorophenoxy-thiocarbonyl]-quinoline.—Colourless prisms from dioxan/ethanol; M.P. 138° C.

(41) 1,2,3,4-tetrahydro-3-methyl-N-[4-chlorophenoxy-thiocarbonyl]-quinoline.—Colourless prisms (dioxan/ethanol); M.P. 117° C.

(42) 1,2,3,4-tetrahydro-4-methyl-N-[4-chlorophenoxy-thiocarbonyl]-quinoline.—Yellowish flakes from dioxan/ethanol; M.P. 99° C.

(43) 1,2,3,4 - tetrahydro-4,6-dimethyl-N-[4-chlorophenoxy-thiocarbonyl]-quinoline.—Colourless prisms(dioxan/ethanol); M.P. 145° C.

(44) 1,2-dihydro-N-[naphthyl-(2)-oxy - thiocarbonyl]-quinoline.—Colourless prisms from dioxan/ethanol; M.P. 137° C.

(45) 1,2-dihydro-8-methyl-N-[naphthyl-(2)-oxy - thiocarbonyl] - quinoline.—Colourless crystals from acetonitrile; M.P. 99° C.

(46) 1,2-dihydro-3-methyl-N-[naphthyl-(2)-oxy - thiocarbonyl]-quioline.—Colourless prisms from dioxan/ethanol; M.P. 175° C.

(47) 1,2-dihydro-4,6-dimethyl-N-[4 - chlorophenoxythiocarbonyl]-quinoline.—Colourless flakes (dioxan/ethanol); M.P. 165° C.

(48) 1,2-dihydro-3-methyl-N-[4-chlorophenoxy - thiocarbonyl]-quinoline.—Colourless flakes (dioxan/ethanol); M.P. 184° C.

(49) 1,2-dihydro-8-methyl-N-[4-chlorophenoxy - thiocarbonyl]-quinoline.—Colourless crystals (dioxan/ethanol); M.P. 165° C.

(50) 1,2,3,4-tetrahydro-4-methyl - N - naphthyl - (2)-oxy-thiocarbonyl-quinoline.—Colourless prisms (dioxan/ethanol); M.P. 105° C.

Compounds 2 through 50 are produced by utilizing the following reactants according to the process outlined above:

TABLE 3

| Compound No. | Acid reactant | Base reactant |
|---|---|---|
| 2 | β-Naphthyl-thiocarbonic acid ester chloride; boiling point: 0.1/110°. | 2,3-dihydro-6-methyl-1,4-benzothiazine; boiling point: 0.01/86-94°; M.P. 42° (cyclohexane). |
| 3 | β-Naphthyl-thiocarbonic acid ester chloride. | 2,3-dihydro-6-trifluoromethyl-1,4-benzothiazine; M.P. 84° (cyclohexane). |
| 4 | do | 2,3-dihydro-2-methyl-1,4-benzothiazine; boiling point: 0.01/77°. |
| 5 | do | 2-3-dihydro-2,6-dimethyl-1,4-benzothiazine; M.P. 32°. |
| 7 | 4-fluorophenyl-thiocarbonic acid ester chloride; boiling point: 7/80-82.° | 2,3-dihydro-1,4-benzothiazine; boiling point: 0.1/98°; M.P. 37° (Ligroin). |
| 8 | 4-chlorophenyl-thiocarbonic acid ester chloride; boiling point: 12/114-116.° | Do. |
| 9 | β-Naphthyl-thiocarbonic acid ester chloride. | 2,3,4,5-tetrahydro-1,5-benzothiazine; boiling point: 0.6/114-118°. |
| 10 | do | 2,3-dihydro-1,4-benzoxazine; boiling point: 0.35/83-84°. |
| 11 | do | 2,3-dihydro-6-methyl-1,4-benzoxazine; boiling point: 0.01/72°. |
| 12 | do | 2,3-dihydro-6-methoxy-1,4-benzoxazine; M.P. 59° (plates/cyclohexane). |
| 13 | do | 2,3-dihydro-2,7-dimethyl-1,4-benzoxazine; B.P. 0.1/77-79°. |
| 14 | do | 2,3-dihydro-2-methyl-1,4-benzoxazine; B.P. 0.2/74°. |
| 15 | do | 2,3-dihydro-2,6-dimethyl-1,4-benzoxazine; B.P. 0.01/74-76°. |
| 16 | do | 2,3-dihydro-2-methyl-6-methoxy-1,4-benzoxazine; B.P. 0.5/134-138°. |
| 17 | do | 2,3-dihydro-indole. |
| 18 | do | 2,3-dihydro-2-methyl-indole. |
| 19 | do | 1,2,3,4-tetrahydro-quinoline. |
| 20 | do | 1,2,3,3-tetrahydro-6-methyl-quinoline. B.P. 0.7/97-98°. |
| 21 | do | 1,2,3,4-tetrahydro-2-methyl-quinoline. |
| 22 | do | 1,2,3,4-tetrahydro-5-methyl-quinoline; B.P. 0.1/69-70°. |
| 23 | do | 1,2,3,4-tetrahydro-7-methyl-quinoline; B.P. 3/114-116°. |
| 24 | do | 1,2,3,4-tetrahydro-8-methyl-quinoline; B.P. 12/126-127°. |
| 25 | do | 1,2,-dihydro-4-6-deimethyl-quinoline; B.P. 0.5/98-103°. |
| 26 | do | 1,2-dihydro-4-methyl-quinoline; B.P. 0.4/80°. |
| 27 | 4-fluorophenyl-thiocarbonic acid ester chloride. | 1,2,3,4-tetrahydro-5-methyl-quinoline. |
| 28 | 4-chlorophenyl-thiocarbonic acid ester chloride. | 1,2,3,4-tetrahydro-8-methyl-quinoline. |

TABLE 3—Continued

| Compound No. | Acid reactant | Base reactant |
|---|---|---|
| 29 | β-Naphthyl-thiocarbonic acid ester chloride. | 1,2,3,4-tetrahydro-4-oxo-quinoline. |
| 30 | do | 1,2,3,4-tetrahydro-1-methyl-6-methylmercapto-quinoxaline; B.P. 0.5/164-166-168°. |
| 31 | do | 1,2,5-tetrahydro-2-methyl-1-ethyl-1,5-benzodiazepine; M.P. 51°. |
| 32 | 4-chlorophenyl-thiocarbonic acid ester chloride. | 2,3-dihydro-1,4-benzoxazine. |
| 33 | β-Naphthyl-thiocarbonic acid ester chloride. | 2,3,4,5-tetrahydro-2-methyl-1,5-benzothiazepine; B.P. 0.01/80-83°. |
| 34 | do | 1,2,3,4-tetrahydro-3-methyl quinoline; B.P. 0.15/74°. |
| 35 | do | 1,2,3,4-tetrahydro-6,8-dimethyl-quinoline; B.P. 0.01/70-72°. |
| 36 | do | 1,2,3,4-tetrahydro-4,6,7-trimethyl-quinoline; B.P. 0.4/102-105°; M.P. 55° (Prismen/Ligroin). |
| 37 | do | 1,2,3,4-tetrahydro-3,8-dimethyl-quinoline; B.P. 0.5/89-90°. |
| 38 | 4-chlorophenyl-thiocarbonic acid ester chloride. | 1,2,3,4-tetrahydro-quinoline. |
| 39 | do | 1,2,3,4-tetrahydro-6-methyl-quinoline. |
| 40 | do | 1,2,3,4-tetrahydro-2-methyl-quinoline. |
| 41 | do | 1,2,3,4-tetrahydro-3-methyl-quinoline. |
| 42 | do | 1,2,3,4-tetrahydro-4-methyl-quinoline. |
| 43 | do | 1,2,3,4-tetrahydro-4,6-dimethyl-quinoline. |
| 44 | β-Naphthyl-thiocarbonic acid ester chloride | 1,2-dihydro-quinoline. |
| 45 | do | 1,2-dihydro-8-methyl-quinoline; B.P. 0.1/69-74°. |
| 46 | do | 1,2-dihydro-3-methyl-quinoline; M.P. 73°. |
| 47 | 4-chlorophenyl-thiocarbonic acid ester chloride. | 1,2-dihydro-4,6-dimethyl-quinoline. |
| 48 | do | 1,2-dihydro-3-methyl-quinoline. |
| 49 | do | 1,2-dihydro-8-methyl-quinoline. |
| 50 | β-Naphthyl-thiocarbodic acid ester chloride. | 1,2,3,4-tetrahydro-4-methyl-quinoline; B.P. 0.4/77-80°. |

What is claimed is:
1. A compound of the formula:

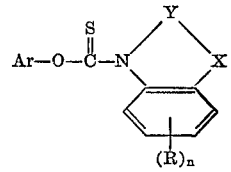

wherein
Ar is phenyl or naphthyl, unsubstituted or substituted by halo, lower alkyl of 1 to 4 carbon atoms or lower alkoxy of 1 to 4 carbon atoms;

Y, taken independently of X, is —CH$_2$CH$_2$—,

—CH$_2$CH(CH$_3$)— or —CH(CH$_3$)CH$_2$—;

X, taken independently of Y, is $\diagdown$CH$_2$, $\diagdown$CHCH$_3$, or $\diagdown$CO
$\diagup$         $\diagup$              $\diagup$ Y and X, taken together, are —CH$_2$CH=CH—,

—CH$_2$C(CH$_3$)=CH— or —CH$_2$CH=C(CH$_3$)—;

R is hydrogen, halo, lower alkyl of 1 to 4 carbon atoms, lower alkoxy of 1 to 4 carbon atoms, lower alkylmercapto of 1 to 4 carbon atoms or trifluoromethyl; and n is 1, 2 or 3.

2. A compound according to claim 1 wherein Y is —CH$_2$CH$_2$— and X is —CH$_2$—.

3. A compound according to claim 2 wherein Ar is naphthyl.

4. A compound according to claim 3 wherein Ar is naphthyl-(2).

5. The compound according to claim 1 which is 1,2,3,4 - tetrahydro - N - [naphthyl - (2) - oxy - thiocarbonyl]-quinoline.

6. The compound according to claim 1 which is 1,2,3,4 - tetrahydro - 6 - methyl - N - [naphthyl - (2) - oxy-thiocarbonyl]-quinoline.

7. The compound according to claim 1 which is 1,2,3,4-tetrahydro - 2 - methyl - N - [naphthyl - (2) - oxy-thiocarbonyl]-quinoline.

8. The compound according to claim 1 which is 1,2,3,4-tetrahydro-5-methyl-N-[naphthyl - (2) -oxy - thiocarbonyl]-quinoline.

9. The compound according to claim 1 which is 1,2,3,4-tetrahydro-7-methyl-N-[naphthyl - (2) - oxy - thiocarbonyl]-quinoline.

10. The compound according to claim 1 which is 1,2,3,4-tetrahydro-8-methyl - [naphthyl - (2) - oxy - thiocarbonyl]-quinoline.

11. The compound according to claim 1 which is 1,2-dihydro-4,6-dimethyl - [naphthyl - (2) - oxy - thiocarbonyl]-quinoline.

12. The compound according to claim 1 which is 1,2-dihydro-4-methyl-N-[naphthyl - (2) - oxy - thiocarbonyl]-quinoline.

13. The compound according to claim 1 which is 1,2,3,4-tetrahydro-5-methyl - N - [4 - fluorophenoxy - thiocarbonyl]-quinoline.

14. The compound according to claim 1 which is 1,2,3,4-tetrahydro-8-methyl-N-[4 - chloro - phenoxy - thiocarbonyl]-quinoline.

15. The compound according to claim 1 which is 1,2,3,4-tetrahydro-4-oxo - N - [naphthyl - (2) - oxy - thiocarbonyl]-quinoline.

16. The compound according to claim 1 which is 1,2,3,4-tetrahydro-3-methyl-N-[naphthyl - (2) - oxy - thiocarbonyl]-quinoline.

17. The compound according to claim 1 which is 1,2,3,4-tetrahydro-6,8-dimethyl-N-[naphthyl - (2) - oxy - thiocarbonyl]-quinoline.

18. The compound according to claim 1 which is 1,2,3,4-tetrahydro-4,6,7-trimethyl-N-[naphthyl-(2) - oxy - thiocarbonyl]-quinoline.

19. The compound according to claim 1 which is 1,2,3,4-tetrahydro-3,8-dimethyl-N-[naphthyl-(2)-oxy - thiocarbonyl]-quinoline.

20. The compound according to claim 1 which is 1,2,3,4-tetrahydro-N-[4-chlorophenoxy - thiocarbonyl] - quinoline.

21. The compound according to claim 1 which is 1,2,3,4-tetrahydro-6-methyl - N - [4 - chlorophenoxy - thiocarbonyl]-quinoline.

22. The compound according to claim 1 which is 1,2,3,4-tetrahydro-2-methyl - N - [4 - chlorophenoxy - thiocarbonyl]-quinoline.

23. The compound according to claim 1 which is 1,2,3,4-tetrahydro-3-methyl - N - [4 - chlorophenoxy - thiocarbonyl]-quinoline.

24. The compound according to claim 1 which is 1,2,3,4-tetrahydro-4-methyl - N - [4 - chlorophenoxy - thiocarbonyl]-quinoline.

25. The compound according to claim 1 which is 1,2,3,4-tetrahydro-4,6,dimethyl-N - [4 - chlorophenoxy - thiocarbonyl]-quinoline.

26. The compound according to claim 1 which is 1,2-dihydro-N-[naphthyl-(2)-oxy - thiocarbonyl] - quinoline.

27. The compound according to claim 1 which is 1,2-dihydro-8-methyl-N-[naphthyl - (2) -oxy - thiocarbonyl]-quinoline.

28. The compound according to claim 1 which is 1,2-dihydro-3-methyl-N-[naphthyl - (2) - oxy - thiocarbonyl]-quinoline.

29. The compound according to claim 1 which is 1,2-dihydro-4,6-dimethyl - N - [4 - chlorophenoxy - thiocarbonyl]-quinoline.

30. The compound according to claim 1 which is 1,2-dihydro-3-methyl-N - [4 - chlorophenoxy - thiocarbonyl]-quinoline.

31. The compound according to claim 1 which is 1,2-dihydro-8-methyl-N-[4 - chlorophenoxy - thiocarbonyl]-quinoline.

32. The compound according to claim 1 which is 1,2,3,4-tetrahydro-4-methyl - N - [naphthyl - (2) - oxy - thiocarbonyl]-quinoline.

References Cited

UNITED STATES PATENTS

| | | | |
|---|---|---|---|
| 3,282,978 | 11/1966 | Swakon | 260—279 X |
| 3,391,147 | 7/1968 | Belleau et al. | 260—287 |
| 3,455,929 | 7/1969 | Belleau et al. | 260—287 |
| 3,476,791 | 11/1969 | Newman | 260—283 S |

DONALD G. DAUS, Primary Examiner

U.S. Cl. X.R.

260—239 R, 243 B, 244 R, 287 R, 304, 307 D, 326 R, 999; 424—246, 258